(12) United States Patent
Rosa

(10) Patent No.: US 10,353,209 B2
(45) Date of Patent: Jul. 16, 2019

(54) OPTICAL ASSEMBLY

(71) Applicant: NIKON CORPORATION, Tokyo (JP)

(72) Inventor: Matthew Rosa, Fremont, CA (US)

(73) Assignee: NIKON CORPORATION, Tokyo (JP)

( * ) Notice: Subject to any disclaimer, the term of this patent is extended or adjusted under 35 U.S.C. 154(b) by 512 days.

(21) Appl. No.: 15/130,479

(22) Filed: Apr. 15, 2016

(65) Prior Publication Data

US 2016/0306180 A1 Oct. 20, 2016

Related U.S. Application Data

(60) Provisional application No. 62/149,272, filed on Apr. 17, 2015.

(51) Int. Cl.
*G02B 27/10* (2006.01)
*G02B 23/24* (2006.01)
(Continued)

(52) U.S. Cl.
CPC ..... *G02B 27/1013* (2013.01); *G02B 23/2415* (2013.01); *G02B 27/145* (2013.01);
(Continued)

(58) Field of Classification Search
CPC .......... G02B 27/141; G02B 27/1006; G02B 27/145; G02B 27/14; G02B 27/142; G02B 5/208; G02B 5/26; G02B 27/1013; G02B 19/0028; G02B 27/1073; G02B 26/008; G02B 27/149; G02B 21/06; G02B 27/102; G02B 27/104; G02B 27/283; G02B 5/045; G02B 6/4215; G02B 19/0057; G02B 23/12; G02B 27/0905; G02B 27/10; G02B 27/1033; G02B 27/144; G02B 5/0825; G02B 5/10; G02B 5/18; G02B 5/285; G02B 7/006; G02B 17/0694; G02B 19/0014; G02B 19/0076; G02B 1/11; G02B 23/04; G02B 23/2469; G02B 26/0816; G02B 27/1026; G02B 27/1053; G02B 27/1066; G02B 27/1086; G02B 27/126; G02B 27/148; G02B 27/30; G02B 5/08; G02B 5/124; G02B 5/20; G02B 5/23; G02B 5/282; G02B 6/02; G02B 6/29367;
(Continued)

(56) References Cited

U.S. PATENT DOCUMENTS 5,097,359 A 3/1992 McKinley
5,539,971 A 7/1996 Kelly
(Continued)

*Primary Examiner* — Collin X Beatty
*Assistant Examiner* — Grant A Gagnon
(74) *Attorney, Agent, or Firm* — Yakov S. Sidorin; Quarles & Brady LLP

(57) ABSTRACT

Optical assembly containing a) at least two pairs of dichroic beamsplitting elements grouped together such that first sides of these elements are parallel and immediately adjacent to one another and to a predetermined line, and b) two optical lenses disposed such that light transmitted through the lenses towards the beamsplitting element passes through the elements without being scattered at the first sides. Optionally, a first dichroic beamsplitting element in a first pair and a first dichroic element in a second pair have equal optical properties. Imaging probe—for example, a laparoscope—employing such optical assembly.

23 Claims, 13 Drawing Sheets

(51) Int. Cl.
  *G02B 27/14* (2006.01)
  *G03B 17/17* (2006.01)
  *G03B 33/04* (2006.01)
(52) U.S. Cl.
  CPC ........... *G02B 27/149* (2013.01); *G03B 17/17* (2013.01); *G03B 33/04* (2013.01)
(58) Field of Classification Search
  CPC .... G02B 6/4246; G02B 13/14; G02B 17/002; G02B 17/02; G02B 17/0896; G02B 19/0019; G02B 19/0042; G02B 19/0047; G02B 19/0052; G02B 19/0061; G02B 19/009; G02B 1/00; G02B 1/005; G02B 2027/0178; G02B 21/0076; G02B 21/04; G02B 21/16; G02B 21/18; G02B 21/248; G02B 21/34; G02B 2207/123; G02B 23/08; G02B 23/2423; G02B 26/001; G02B 26/002; G02B 26/007; G02B 26/02; G02B 26/023; G02B 26/04; G02B 26/0833; G02B 27/0018; G02B 27/0025; G02B 27/0081; G02B 27/0101; G02B 27/017; G02B 27/0955; G02B 27/0977; G02B 27/0994; G02B 27/123; G02B 27/143; G02B 27/146; G02B 27/26; G02B 27/40; G02B 27/46; G02B 3/0037; G02B 3/08; G02B 5/008; G02B 5/0231; G02B 5/0294; G02B 5/04; G02B 5/0891; G02B 5/12; G02B 5/1866; G02B 5/201; G02B 5/203; G02B 5/205; G02B 5/206; G02B 5/22; G02B 5/28; G02B 5/283; G02B 5/286; G02B 5/289; G02B 5/3066; G02B 6/0001; G02B 6/0005; G02B 6/005; G02B 6/02033; G02B 6/02042; G02B 6/036; G02B 6/12011; G02B 6/12021; G02B 6/264; G02B 6/2817; G02B 6/29352; G02B 6/29362; G02B 6/29365; G02B 6/3512; G02B 6/3562; G02B 6/3586; G02B 6/4204; G02B 6/4206; G02B 6/4207; G02B 7/24; H01S 5/4012; H01S 3/09415; H01S 3/094053; H01S 5/005; H01S 5/4087; H01S 2301/03; H01S 3/08; H01S 3/08059; H01S 3/09408; H01S 3/0941; H01S 3/2383; H01S 5/0057; H01S 5/0078; H01S 5/02248; H01S 5/141; H01S 5/405; H01S 5/4062; H01S 3/00; H01S 3/005; H01S 3/0078; H01S 3/0092; H01S 3/034; H01S 3/06733; H01S 3/0675; H01S 3/08004; H01S 3/08086; H01S 3/0815; H01S 3/091; H01S 3/0912; H01S 3/0933; H01S 3/094057; H01S 3/094084; H01S 3/094096; H01S 3/102; H01S 3/105; H01S 3/106; H01S 3/109; H01S 3/1095; H01S 3/13; H01S 3/1305; H01S 3/131; H01S 3/1611; H01S 3/1618; H01S 3/1643; H01S 3/175; H01S 3/176; H01S 3/2391; H01S 5/0064; H01S 5/02284; H01S 5/0287; H01S 5/06216; H01S 5/0653; H01S 5/32341; H01S 5/3401; H01S 5/4056; G03B 33/12; G03B 21/204; G03B 21/14; G03B 21/2013; G03B 21/2066; G03B 21/28; G03B 21/20; G03B 21/2033; G03B 21/2073; G03B 15/03; G03B 21/005; G03B 21/006; G03B 21/008; G03B 21/208; G03B 21/26; G03B 27/14; G03B 33/10; G03B 35/08; B32B 2307/416; B32B 27/08; B32B 27/20; B32B 7/12; B32B 15/08; B32B 15/20; B32B 17/06; B32B 17/064; B32B 2255/10; B32B 2255/26; B32B 2264/0235; B32B 2264/025; B32B 2264/10; B32B 2264/102; B32B 2307/302; B32B 2307/404; B32B 2307/412; B32B 2307/418; B32B 2307/712; B32B 2307/752; B32B 2425/00; B32B 2605/006; B32B 27/308; B32B 27/36; B32B 27/365; B32B 3/30
  USPC ........................................................ 359/634
  See application file for complete search history.

(56) References Cited

U.S. PATENT DOCUMENTS

| | | | |
|---|---|---|---|
| 6,652,452 B1 | 11/2003 | Seifert et al. | |
| 6,995,917 B1* | 2/2006 | Sampsell | G02B 27/123 348/E5.141 |
| 7,755,063 B2* | 7/2010 | Baer | G02B 21/0056 250/458.1 |
| 7,869,140 B2 | 1/2011 | Duckett, III | |
| 2008/0188715 A1* | 8/2008 | Fujimoto | A61B 1/00091 600/157 |
| 2009/0303317 A1* | 12/2009 | Tesar | C03C 17/3417 348/65 |

* cited by examiner

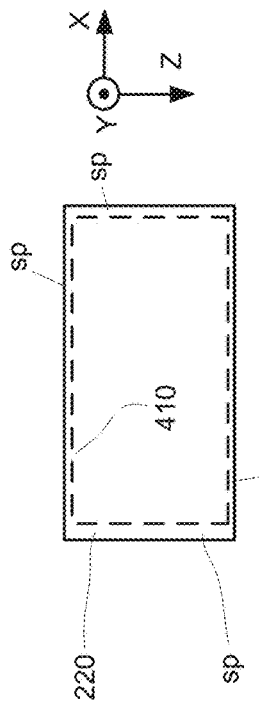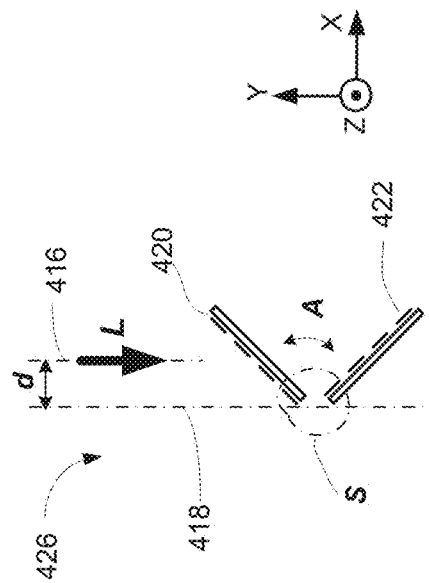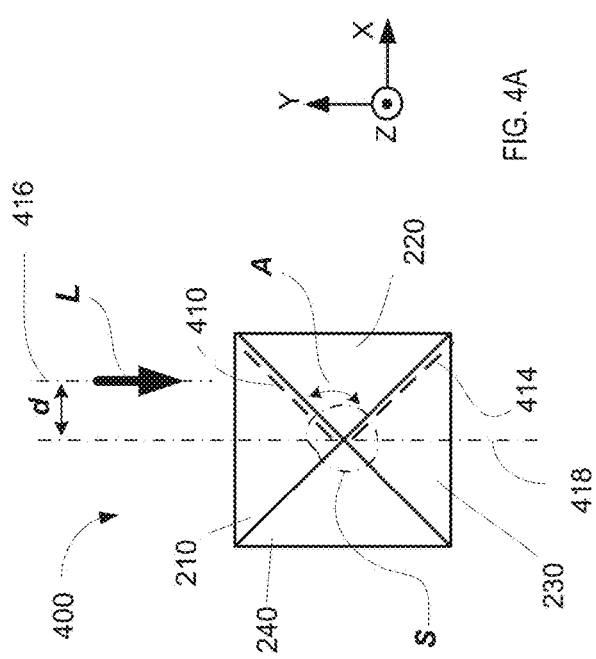

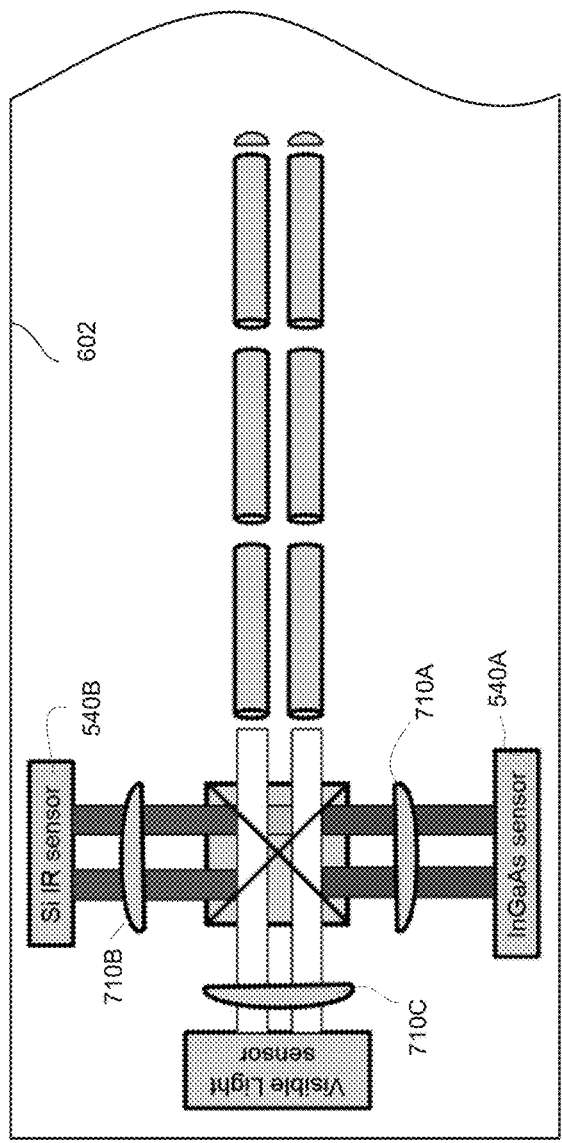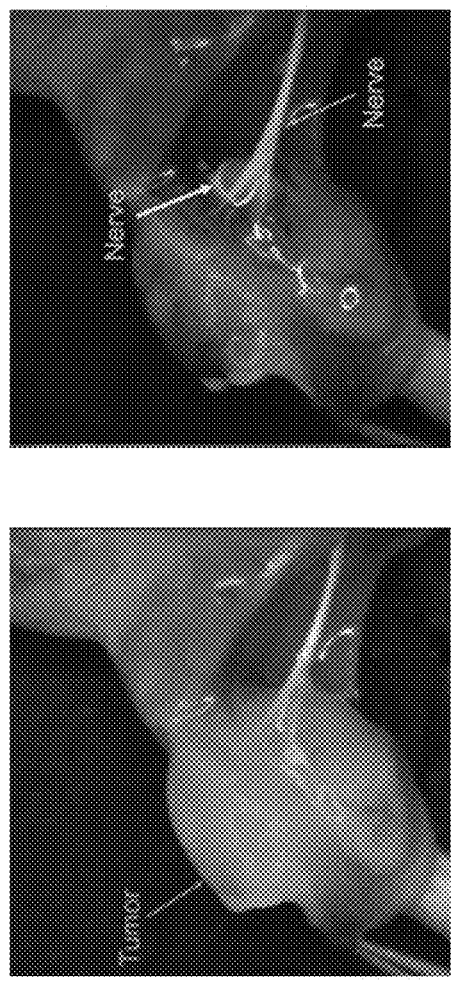
FIG. 7A
FIG. 8A
FIG. 8B

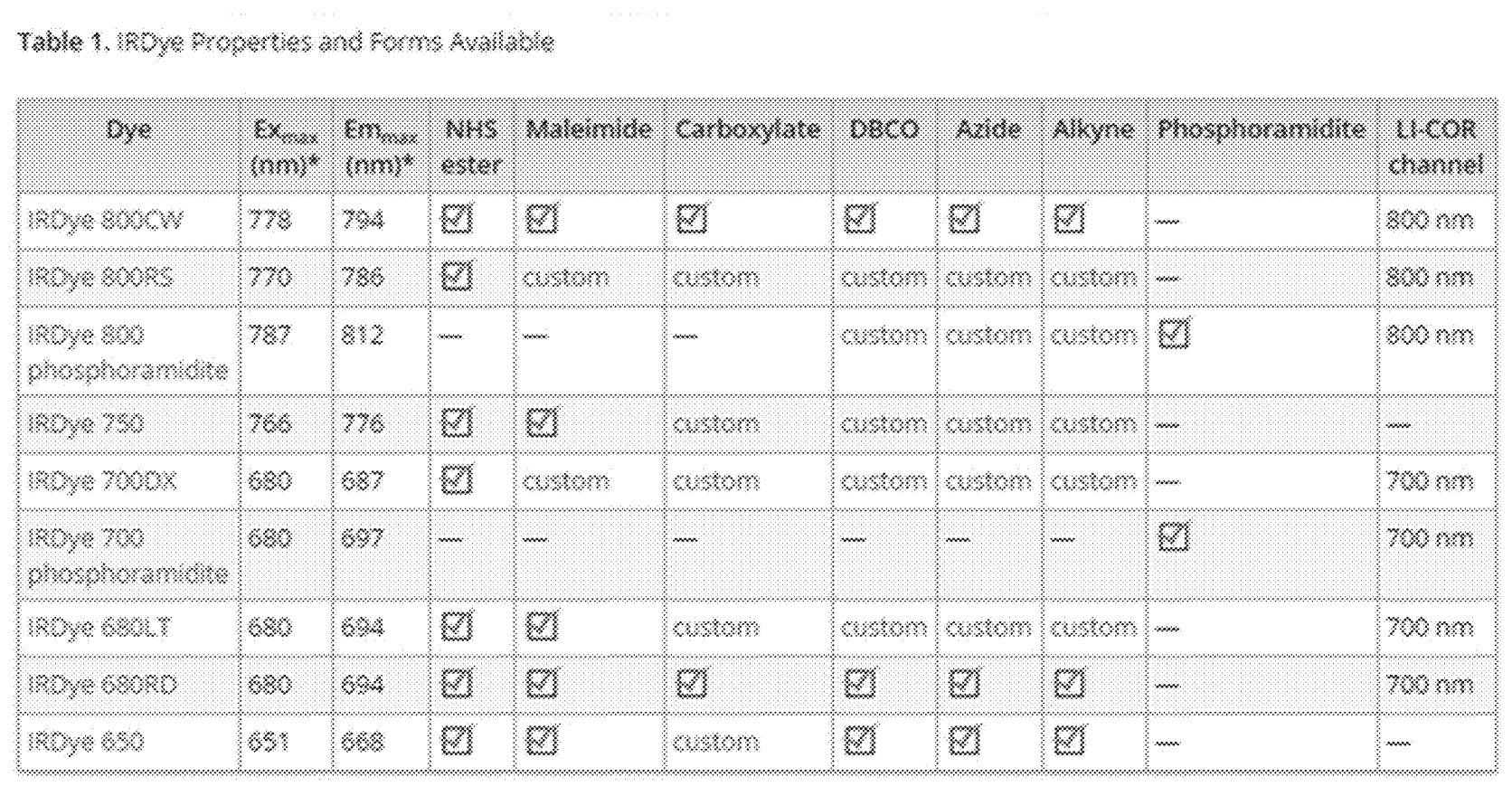

Table 1. IRDye Properties and Forms Available

| Dye | Ex$_{max}$ (nm)* | Em$_{max}$ (nm)* | NHS ester | Maleimide | Carboxylate | DBCO | Azide | Alkyne | Phosphoramidite | LI-COR channel |
|---|---|---|---|---|---|---|---|---|---|---|
| IRDye 800CW | 778 | 794 | ☒ | ☒ | ☒ | ☒ | ☒ | ☒ | — | 800 nm |
| IRDye 800RS | 770 | 786 | ☒ | custom | custom | custom | custom | custom | — | 800 nm |
| IRDye 800 phosphoramidite | 787 | 812 | — | — | — | custom | custom | custom | ☒ | 800 nm |
| IRDye 750 | 756 | 776 | ☒ | ☒ | — | custom | custom | custom | — | — |
| IRDye 700DX | 689 | 687 | ☒ | custom | custom | custom | custom | custom | — | 700 nm |
| IRDye 700 phosphoramidite | 689 | 697 | — | — | — | — | — | — | ☒ | 700 nm |
| IRDye 680LT | 680 | 694 | ☒ | ☒ | custom | custom | custom | custom | — | 700 nm |
| IRDye 680RD | 680 | 694 | ☒ | ☒ | ☒ | ☒ | ☒ | ☒ | — | 700 nm |
| IRDye 650 | 651 | 668 | ☒ | ☒ | custom | ☒ | ☒ | ☒ | — | — |

FIG. 12

OPTICAL ASSEMBLY

CROSS-REFERENCE TO RELATED APPLICATIONS

The present application claims priority from the U.S. Provisional Patent Application No. 62/149,272 filed on Apr. 17, 2015, and titled "Optical Assembly", the disclosure of which is incorporated herein by reference.

TECHNICAL FIELD

The present invention relates to optical systems and methods for separating components of light and, in particular, to those configured to be deployed in an optical probe such as an endoscope for characterization of a biological tissue.

BACKGROUND

While methodologies of collecting optical information about a target tissue (such as a biological tissue) with various probes are many, most of those make use of some optical channel, operably connecting the target and the optical detector unit (such as a CCD camera with an accompanying electronic circuitry), and a mechanism of dispersing the light collected from the target into components that, when analyzed independently from one another, often provide complementary information about the target. The optical channel is sometimes structured as a "fiberscope" (in which case light is channeled between the proximal and distal ends of the flexible probe by at least one dedicated optical waveguide) and, alternatively, the optical channel may employ a system of lenses (disposed in and supported by a rigid tubular body) that act as an optical relay of the now-rigid endoscope.

A typical non-limiting example of the family of such endoscopes is provided by laparoscopes, which are often used to provide access to the target tissue through small incisions made in a body. Since the user does not have direct access or vision of the site of interest, the quality of the image provided by the endoscope is of paramount importance. Other operational parameters cannot be discarded either—one of those being the size and weight of the endoscope.

It is recognized that the laparoscopes employing a lens-based relay system, often referred to as proximal sensing laparoscopes, can be relatively large, because the optical sensors of such devices are disposed in operation outside of the body. As a corollary of the use of optical lenses, however, these devices afford good photonic, optical, and electrical performance and remain dominant in practice. The fiberscope-based laparoscopes also have their optical detection units affixed to ends of the fiberscopes. An alternative option of constructing a laparoscope, in which a small CCD or CMOS sensor is disposed inside the laparoscope immediately at the objective of the laparoscope, attracted attention with advances in imaging sensor technology and miniaturization. These are referred to as distal sensing laparoscopes and, due to the chosen configuration, these devices are devoid of complexities of fiber bundles and/or relay optics that related technologies are used to rely on.

Endoscopic (and, in particular, laparoscopic) systems of related art have many shortcomings. For example, proximal sensing laparoscopes must use relay optics to transmit the image through the laparoscope. The misalignment of each optical element vignettes the final view, resulting in poor performance. Improvements in alignment schemes have been produced, yet most are bought through experience and proprietary methodology. Images formed with the use of a fiberscope are pixilated, in direct relation to the thickness and position of each fiber with respect to the optical detector, resulting in a grating effect on the image and a significant reduction in resolution. While distal sensing laparoscopes may avoid these problems, their operation is disadvantageously affected by the small diameter of the laparoscope. Often, laparoscopes measure 5 mm to 10 mm in diameter, so the optical sensors must be even smaller to fit in the limited space provided by the interior of the laparoscope.

The laparoscope devices are sometimes structured to provide two optical channels—in practice, by combining two small diameter laparoscopes bundled together, side by side, in a regularly-sized package. The image from one optical channel is delivered to the left eye of the user, while the image corresponding to another optical channel is delivered to the right eye of the user. Utilizing video cameras and modern means of displaying three-dimensional (3D) images (such as switching LCD glasses, polarized glasses, head mounted displays), the operator is often able to perceive the 3D image from the perspective of the two-channel laparoscope. Such "3D laparoscopes" are extremely demanding on optics and electronics packaging dimensions. This significantly reduces the design space.

If required, the laparoscopic systems may be operationally enhanced by extending the range of wavelengths of light sensed at the image sensor to those beyond visible light. The most useful of these wavelengths are those in the NIR and IR portions of the spectrum, as absorption of these wavelengths by biological tissue is relatively low. While light at wavelengths up to 2 microns, has been shown to aid in the identification of cancers and different biological tissues, the operational range of currently-existing laparoscopic systems does not extend beyond the NIR wavelengths. For example, NIR fluorescent dyes such as indocyanine green (ICG) may be introduced into the bloodstream or otherwise affixed to the tissue used to identify blood vessels during surgery. Profusion of blood in some cases can be used to identify tumors in organs. These types of image sensors are incorporated into state of the art laparoscopes, but only in proximal sensing laparoscopes.

When an endoscope is intended to operate at multiple wavelengths, it can be equipped with a three-sensor optical camera which is configured to include three CCD/CMOS sensors, for example, and the objective lens which is disposed such that a series of dichroic or bandpass prisms split the incoming from the target light into individual components (for example, those in red, green, and blue portions of the spectrum) before reaching the sensors. Each component of incoming light signal is then detected by a single sensor. (This is opposed to a single-sensor camera that utilizes color filters over the detector to provide for the RGB channels for a color image.) To maintain equal focal lengths in each of the sought-after spectral regions, compact footprint, modern three-sensor cameras utilize a Philips-style dichroic prism 100, shown in FIG. 1. The advantage of the Philips-style three sensor camera is that a user is no longer limited by the ability to create micron-by-micron square, color filters on the sensor. This frees up the design space of the sensor. Additionally, there is no longer any demozaicing needed with the traditional Bayer filter (resulting in higher true-color resolution). While these advantages are recognized, the Philips-style dichroic prism is known to be too large to fit within the size constraints of a distal sensing laparoscope (containing either one or two optical channels). In fact, the Philips-style prism is substantially larger than any of the image sensors used with it. Accordingly, the space of operation of such arrangement is limited to the proximal sensing probes, which are not under constraints of limited space of the housing hosting an optical channel of the laparoscope. Other beam-splitting optical systems that could be used to separate light delivered by an optical channel of an endoscope towards the optical detection unit often at least partially block delivered light, thereby deteriorating the resulting images by at least reducing the range of spatial frequencies of the incoming light.

Accordingly, there remains a need for improvement of laparoscopic imaging technology that overcomes the aforementioned shortcomings.

SUMMARY

An embodiment of the invention provides an optical assembly that includes at least two pairs of dichroic beamsplitting elements grouped together such that first sides of said elements are parallel and immediately adjacent to one another and to a predetermined line, and two optical lenses disposed such that light transmitted through said lenses towards said elements passes through said elements without being scattered at the first sides.

A related embodiment of the invention provides an optical assembly that includes first, second, third, and fourth dichroic beamsplitter elements, an area of each of the dichroic beamsplitter elements being bound by a corresponding polygon. These dichroic beamsplitters are disposed such that first sides of each of the polygons extend along a predetermined line and are immediately adjacent to one another. The assembly further includes two optical lenses, each having a corresponding optical axis that is transverse to the predetermined line and passes through bodies of at least two polygons of said polygons at points each of which is spatially separated by a distance from corresponding primary sides of the at least two peripheral polygons. The lenses are disposed on the same side with respect to a group of said dichroic beamsplitter elements.

Another related embodiment of the invention provides a method for operating an optical assembly, which method includes a step of transmitting light from outside of the optical assembly through two lenses of the assembly towards at least four dichroic beamsplitter elements of the assembly. The assembly is disposed within a cylindrical housing. An operating surface of each of said at least four dichroic beamsplitter elements is bound by a polygon; first sides of all polygons are parallel to a predetermined line and immediately adjacent to one another; and an optical axis of each of the two lenses is transverse to the predetermined line, spaced therefrom by a distance, and intersects at least bodies of at least two of the polygons. The method additionally includes reflecting said light from at least two of the dichroic beamsplitter elements to form at least first and second reflected portions of light and a transmitted portion of light. The method further includes receiving each of the portions of light by a corresponding optical detector from at least three optical detectors of the optical assembly.

BRIEF DESCRIPTION OF THE DRAWINGS

The invention will be more fully understood by referring to the following Detailed Description in conjunction with the generally not-to-scale Drawings, of which:

FIGS. 4A, 4B, 4C, 4D, and 4E illustrate embodiments of a beamsplitting unit of the invention;

FIG. 7A is a diagram of an alternative embodiment of an endoscopic probe employing an optical assembly structured according to an idea of the invention;

FIGS. 8A, 8B are pseudo-color images illustrating the use of an embodiment of the invention as a laparoscope;

FIG. 12 includes Table 1 summarizing several itemized spectral characteristics of IR dyes.

DETAILED DESCRIPTION

The present invention stems from the realization that operational range of an endoscopic system (such as a laparoscope, for example) can be advantageously broadened—both spectrally and spatially—by configuring beamsplitting means of the endoscopic system as cross-style dichroic prism in optional combination with the use of multiple optical channels in a single laparoscope device.

Embodiments of the present invention provide optical systems that i) have a footprint that is advantageously smaller than footprint of a Philips-type beamsplitter conventionally used with laparoscopes; ii) facilitate both spectral and spatial separation (and detection) of the optical signal acquired with the endoscope from the target into at least three spectral components while avoiding image artifacts caused by interaction of beamsplitting optics with the incoming light; and iii) provide for a quasi-stereo imaging of a target. The compact footprint affords usage of an embodiment in a distal sensing laparoscope (which, to the best of available information, has not been realized to-date with the use of a Philips-type prism), thereby prompting a possibility of a new, currently non-existing family of optical devices. The separation and detection of incoming light into at least three spectral bands provides not only for a flexibility in target tissue characterization (with or without the use of appropriate markers such as fluorophores, for example) by following and detecting the optical response of an imaged target in different spectral bands, but also provides the ability to employ a laparoscopic system at wavelengths extending up to 2 microns and longer—which has not been achieved by related art yet.

Embodiments of the invention solve at least two problems simultaneously: a problem of reduction of a footprint of a wavelength-selective (chromatic) beamsplitter (as compared with that characterizing a Philips-type beamsplitter) that forms at least three or more spatially-distinct beams of light (each beam characterized by a different spectral range), and a problem of using such beamsplitter within the sheath and under spatial constraints of a distal sensing laparoscope.

These problems are solved by devising a multichromatic beamsplitting unit that contains multiple dichroic beamsplitters and judiciously defining an optical input to such unit to be transversely offset from the geometrical center of the unit.

Figure 1:
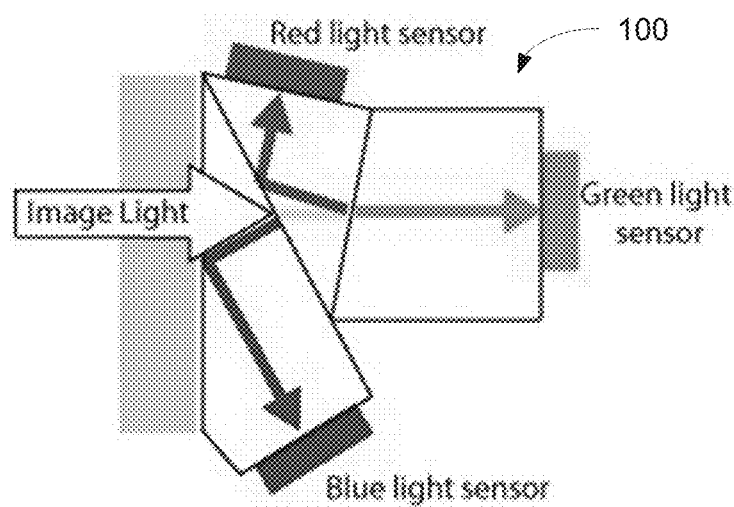
FIG. 1 is a diagram showing a Philips-style dichroic prism and sensors cooperated with the prism.
Figure 2:
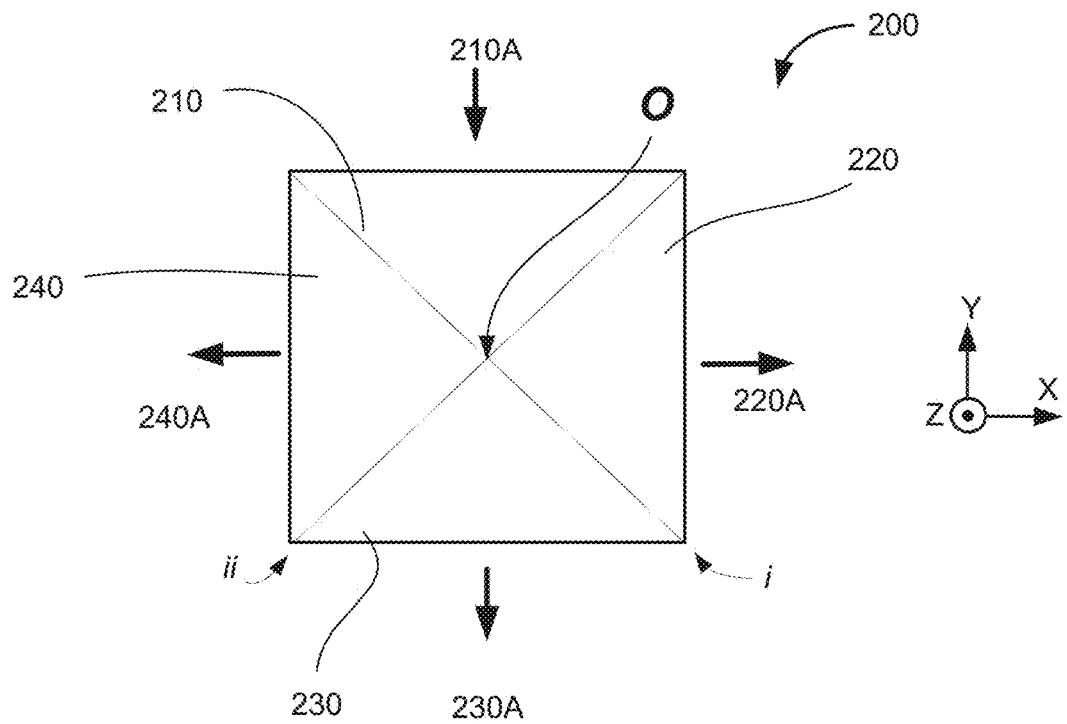
FIG. 2 is a diagram of an embodiment of a dichroic prism.

According to an idea of the invention, the unmet need in reduction of a footprint of the optical system as compared to that specific to the Philips-style beamsplitter 100 of FIG. 1 (or a similar prism known in the art) is achieved by employing a combination of chromatic beamsplitters spatially coordinated with one another in a fashion resembling that of a cross-style dichroic prism. FIG. 2 shows a simple cross-style dichroic prism unit 200, configured from four (4) right-angle constituent prisms and configured to spatially re-distribute portions of light input (that has been received from outside of the prism 200) through and with the use of the constituent prisms in a spatially-distinct fashion based on spectral contents of the light input. The constituent prisms 210, 220, 230, 240 are assembled in such a way that all four roofs (defined by the right angles) of these prisms come together along the same line defining at the center of the combined, rectangularly-shaped prism unit 200. On either of the roof surfaces of either of the prisms a dichroic beamsplitting filter can be disposed (which, in this case, is sandwiched between the facing-each-other surfaces of the immediately neighboring roofs of the immediately neighboring constituent prisms). Generally, along any of the four joining planes between the triangular right-angle constituent prisms, a corresponding dichroic filter can be placed, for example by applying a thin film to one of the corresponding prism facets.

In the example of FIG. 2, the dichroic filters are arranged such that a given filter that spans between the two facing each other roof-surfaces of the two immediately neighboring constituent prisms from about "the line of contact" of all constituent prisms indicated with point O to about the corner of the prism unit 200. For example, a dichroic filter extending along and between the facing-each-other surfaces of the roofs of prisms 220 and 230 (that is, located between the first axis parallel to the z-axis and passing through point O and the second axis passing through point i and parallel to the z-axis) may be configured to a portion of input light 210A (that is, light 220A) in the blue portion of the spectrum. At the same time or independently, the beamsplitting filter that spans from the point of contact of all constituent prisms (the first axis) to the bottom left (the third axis passing through point ii and parallel to the z-axis) may be configured to reflect the portion 240A of the input light 210—the portion carrying red light, for example. Neither of these individual dichroic filters is structured to have any effect on any light other than that at the wavelength(s) for which such individual filter is tuned, so light 230A (as an input light portion at wavelengths within the green band of the spectrum) can pass through each of these filters. In other words, the example of the chromatic prism-unit based filter of FIG. 2 operates to form by separation (or, alternatively, combine) three spectral channels without any practically-noticeable (if at all) spectral interference.

However, the same cannot be said about the effect that the prism unit 200 exerts on the spatial parameters of the light-beams. Indeed, as would be readily appreciated by a skilled artisan, the spectral filtering properties of the prism unit 200 are frustrated along the "seam" area volume of the unit 200 that is defined around the line along which the apexes of the constituent right-angle prisms 210, 220, 230, and 240 are brought in immediate proximity or even in contact with one another. In FIG. 2, the "seam" extends along an axis parallel to the z-axis and passing through point O.

Figure 3:
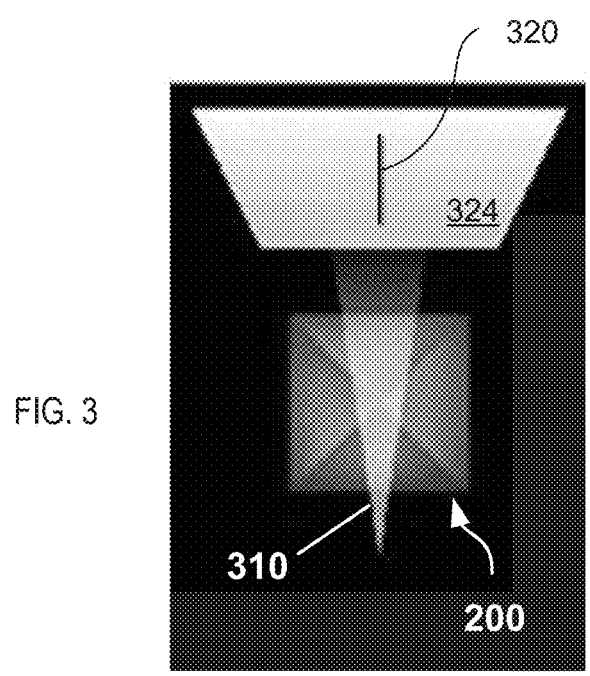
FIG. 3 illustrates the formation of an imaging defect during the conventional use of the embodiment of FIG. 2.

In practice, the seam is formed by a slight chamfer in the constituent prisms or imperfections in the thin-film filter(s) along that boundary and/or by the lack of a thin-film filter coating at a peripheral edge portion of a given surface of the roof carrying such filter coating. Because the seam is located at the periphery of each of the dichroic filters, and because limitations in the coating technologies for dichroic filters do not afford a 100% clear aperture (by effectively reducing it as a result of thin-film deposition due to the fact that the perimeter of the deposited thin film is smaller than the perimeter of the underlying substrate), light incident onto a given constituent prism does not transmit well near and/or through the seam area/volume and is scattered and/or deviated and/or remains spectrally unmodified as intended. This is illustrated schematically in FIG. 3, where transmitting light 300 through the seam is shown to cause, along the seam, a "dark line" 320 in the light field 324 formed by the transmitted light. Performance of any beamsplitter generally configured according to the principle of a cross-style prism 200 will have similar operational shortcomings.

It is also believed that no medical imaging probe—let alone a stereoscopic imaging probe—has employed such principles at least in part because the use of several sensors in a stereoscopically-configured imaging probe has been cost-prohibitive. Embodiments of the present invention are configured to operate by splitting the incoming light into spatially-distinct spectral components (in contradistinction with combining different spectral components into a beam of light having a broad spectrum, such as white light, for example).

In so doing, the problem of degradation of optical imaging of an embodiment of the invention (that employs a chromatic beamsplitter unit structured according to the principle of a cross-style prism), caused by the presence of a spatial "seam" in such beamsplitter unit, is solved by judiciously shifting an optical beam transmitted through the beamsplitter unit away from the spatial area containing the seam to provide a transverse offset between the incoming beam and the seam and to avoid imaging artifacts that would appear otherwise. The ability to avoid the image artifact, otherwise inevitably caused due to transmitting light through the "seam", addresses the need for an increase of spatial resolution of imaging that is provided by a given system.

As used herein, the term "immediately adjacent" refers to objects disposed in close proximity to one another without being separated from one by another optical component (with an exception of a thin-film structure, optionally deposited onto at least one of these two objects), while not necessarily touching one another. For example, positioning of the constituent prisms 230, 230 with respect to one another is immediately adjacent or immediately neighboring. The apexes of the roof of these prisms are also disposed immediately adjacent to one another.

According to an idea of the invention, an embodiment of the optical system of the invention includes at least first and second dichroic beamsplitting elements, an area of each of which is bound by a corresponding polygon, and two optical lenses. A polygon is traditionally a plane figure that is bound by a finite chain of straight line segments closing in a loop to form a closed chain or circuit. These segments are known as edges or sides of the polygon, and the points where two polygon edges meet are the polygon's vertices or corners. The interior of the polygon is referred to as its body. The beamsplitting elements are disposed such that facing-each-other first sides of first and second polygons (corresponding to first and second beamsplitting elements, respectively) extend along a predetermined line and are immediately adjacent to one another. The two optical lenses (or, in some implementations, two optical lens systems) are oriented such that each of their optical axes is transverse to the predetermined line and passes through the bodies of the first and second polygons at points each of which is spatially separated by a chosen distance from corresponding first sides of these two polygons. In one implementation, such separating distance may be equal to or greater than a radius of a chosen from the two optical lenses. The two optical lenses are disposed on the same side with respect to the first and second beamsplitting elements. Several non-limiting examples of the spatial coordination of the first and second beamsplitting elements is illustrated schematically in FIGS. 4A, 4B, 4C, 4D, and 4E.

Figure 4E:
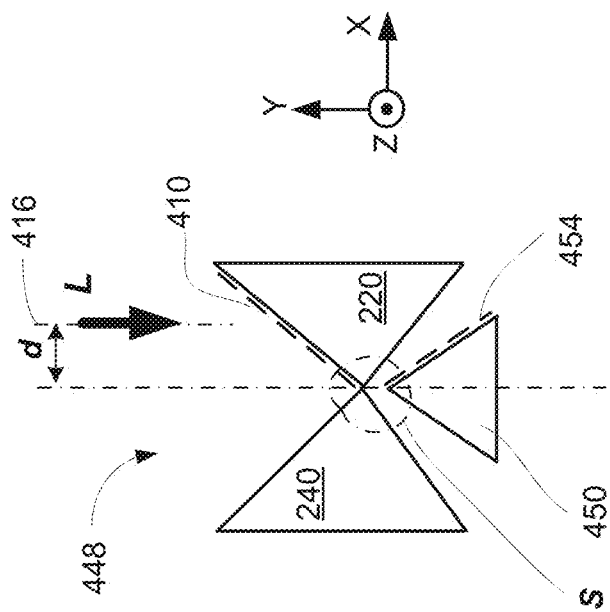

The embodiment 400 of the beamplitting unit of the invention, FIG. 4A, is shown to utilize a cross-style prism 200 (containing a combination of four right-angles prisms 210, 220, 230, 240 that are brought in very close proximity or even in contact along surface forming their roofs). The dichroic thin-film filters 410, 414 are deposited each on one of the immediately-adjacent surfaces of the constituent prisms facing each other. A non-limiting example of geometry of the beamsplitting elements is shown in front view on FIG. 4B, where the boundary of the beamsplitting thin-film filter 410 forms a rectangle. In related embodiments, a boundary of an individual beamsplitting element generally forms a closed polygon. SP-portions (defining a peripheral band area) of the surface Of 220 that are not covered by a thin-film filter 410 may form a "seam" are when beamsplitting units are brought together as discussed herein. With respect to any embodiment of FIGS. 4A, 4C, 4D, and 4E, a side of a polygon defining a boundary of a given beamsplitting/dichroic filter element that is nearest to a polygon-shaped perimeter of another beamsplitting element/dichroic filter of the embodiment may be referred to as the primary side of such polygon.

In one implementation, the filters 410, 414 can be formed using a thin-film deposition method on the surfaces of the prism 220 that form right angle A. The arrow L indicates a direction of light beam delivered by an optical lens (not shown) to the beamsplitter unit 400 from the target (such as a biological tissue; not shown) along a line 416. The area of a "seam" (causing imperfection of light delivery), where the individual elements 410, 414 approach each other, is denoted as S. According to the idea of the invention, the axis 416 (defining the axis of the light beam L) is transversely shifted with respect to a line 418 that passes through the area of the seam transversely to the seam (as shown in FIG. 4A—transversely to the z-axis). As a result of such intentional shift, the light-beam L delivered to the beamsplitting elements (410, 414 in FIG. 4A) passes through the splitting elements to generate partial optical beams that are further delivered to the optical sensors, while avoiding the area of the seam S (which improves the spatial resolution of images formed on the sensors). The optical sensors are preferably associated with corresponding output facets of the beamsplitting unit (to which the sensors can be affixed, for example, by establishing optical contact as known in the art or from which the sensors can be separated by a pre-determined distance), as discussed further.

Figure 4D:
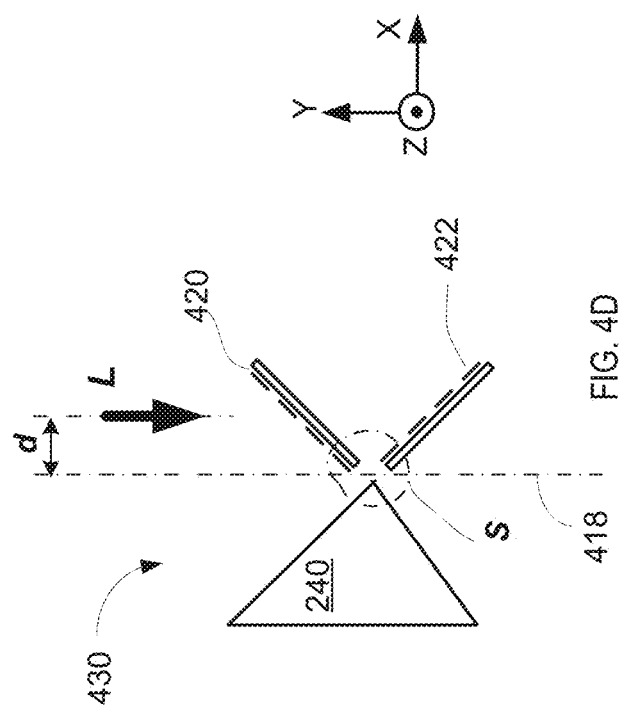

It is appreciated that individual beamsplitting elements or units do not have to be associated with a surface of a prism but can be formed, for example, on a substrate configured as a membrane or a plane-parallel plate. The use of such individually-standing beamsplitting elements 420, 422 to form an embodiment 426 is illustrated in FIG. 4C. FIGS. 4D and 4E provide related examples 430 and 448. Here, the embodiment of FIG. 4C employs both a prismatic element 240 and individual, stand-alone beamsplitting elements 420, 422, while the embodiment of FIG. 4D is formed by a combination of three prismatic components (220 and 240, the apexes of which are shown to be substantially in contact with one another), and a prism 450 the apex of which is shown separated from both prism 220 and prism 240. In the latter embodiment, the dichroic filter elements 410 and 454 are associated with the surfaces of prisms 220 and 450, respectively.

Several notes are in order. As the spatial distribution of individual beams formed as a result of beam-splitting of incoming beam of light L by a given beamsplitting unit obeys well-known Fresnel laws, the individual beams formed by such splitting are not shown for simplicity of illustration. Accordingly, the beamsplitting surfaces of an embodiment of a beamsplitting unit can be mutually positioned such as to provide for redirection of partial beams (formed at these beamsplitting surfaces) at pre-determined angles with respect to an optical axis of a lens of the embodiment. In a related implementation (not shown), the beamsplitting unit can be configured to accept two or more optical beams (L1, L2, . . . ) delivered to it by more than one optical lens from the target being imaged, in which case the optical lenses are judiciously disposed to have each of the incoming beams to be shifted (with respect to line 418) in a plane that is transverse to line 418 to avoid the overlap of incoming light with the seam area S. The spatial cooperation of the dichroic filter elements in various other combinations and on variously-shaped substrates can also be devised, and is within the scope of the invention. Generally, more than two dichroic filter elements can be used, of which two or more can possess similar or identical optical properties. Generally, when individual prismatic elements are employed, such individual prismatic elements do not have to be necessarily right-angle prisms, but may include other types of prisms (see, e.g., prism 450 of FIG. 4E). The operation of the beamsplitting units configured according to an idea of the invention can be effectuated in either transmission or reflection, or both in transmission and reflection (depending on the optical properties of the individual dichroic filter elements). A surface of a substrate on which an individual dichroic filter element is formed can generally be curved and not flat, in which case the resulting beamsplitting element is formatted to change the curvature of the optical wavefront of light L passing through or reflecting from it. Components of a given beamsplitting unit (such as units 400, 420, 440, 448) do not have to be in physical contact, in which case the seam area S is formed by components located in close proximity to one another. In some implementations, at least one facet of at least one constituent component of a beamsplitting unit of the invention may be coated with an anti-reflection (AR) coating.

Figure 5A:
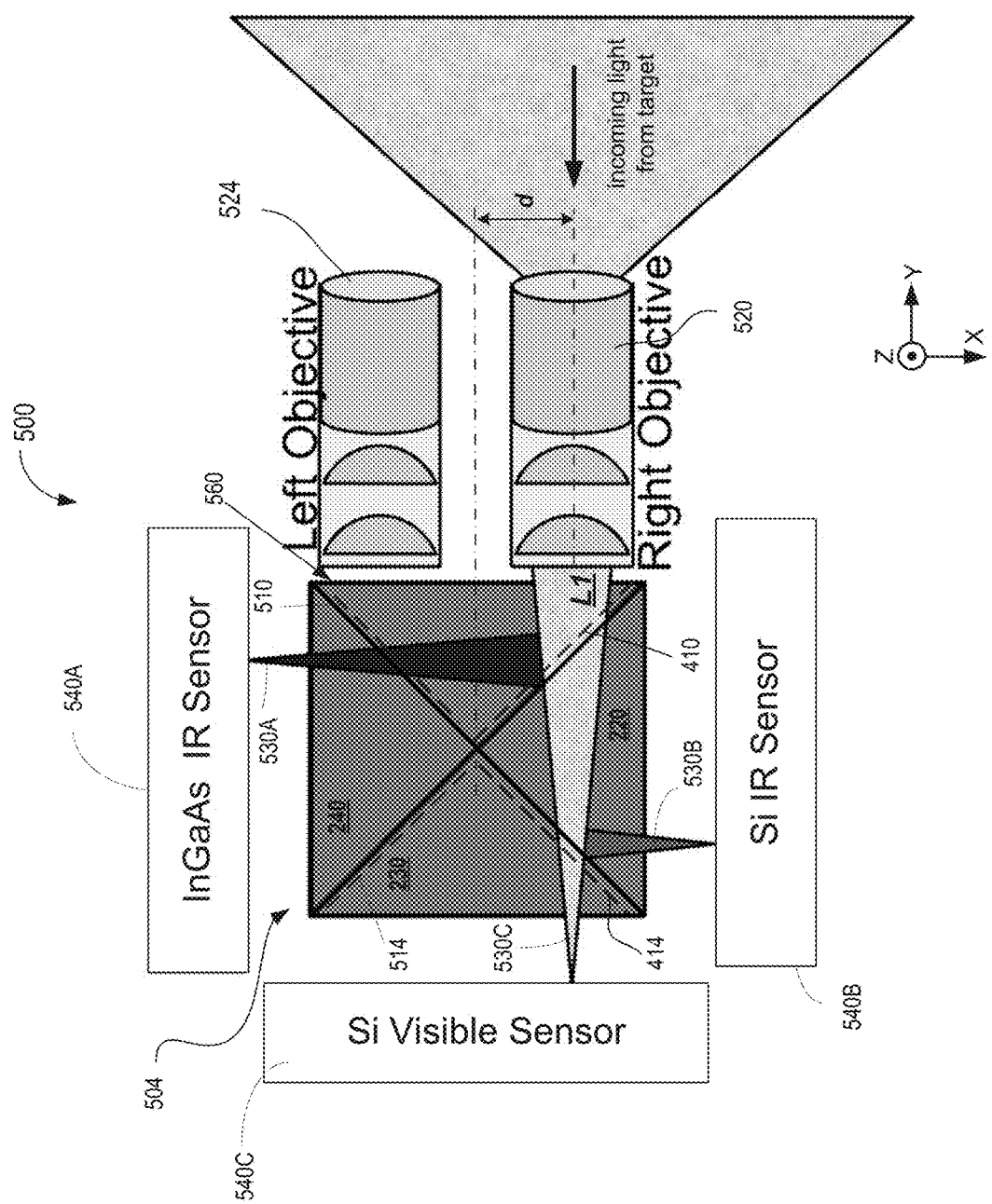
FIGS. 5A and 5B provide complementary illustrations of an embodiment of an optical assembly of the invention.
Figure 5B:
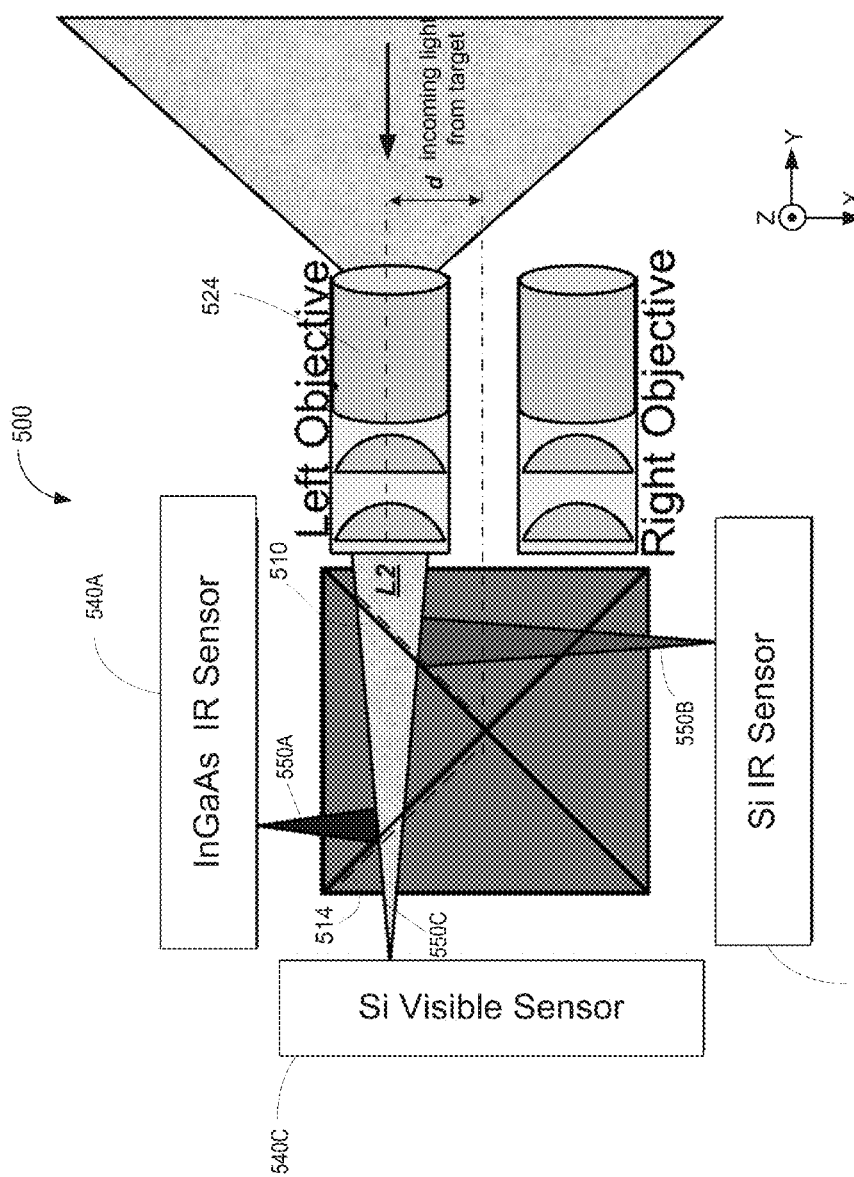

FIGS. 5A, 5B, 6A, 6B, 6C 7A, 7B, 8A, 8B, 9A and 9B provide additional description of several specific embodiments of the invention. The mutually-complementing FIGS. 5A and 5B illustrate the not-to-scale embodiment 500 of the three-sensor stereo optical system of the invention that includes the beamsplitting unit 504, structured according to the principles described in reference to FIG. 4A. The unit 504 includes four right-angle constituent prisms 210, 220, 230, and 240 are all brought together along their respective roof surfaces such that a dichroic filter (of dichroic filters shown as 410, 414, 510, 514) carried by a roof surface is present between first and second facing-each-other roof surfaces. The constituent prisms are made of one or more of materials conventionally used in the art (such as, for example, are spatially cooperated in a cross-style fashion such that their apexes are disposed in close proximity to one another to define a seam area, while a facet forming a roof of one of the constituent prisms is parallel to and in close proximity or even in optical contact with a surface forming a roof of another constituent prism.

The unit 504 that is positioned to receive light beams L1, L2 delivered from the target tissue (not shown) through two lenses 520, 524 (denoted as the right and left objectives). For simplicity of illustration, FIG. 5A depicts the acquisition of 3D optical information from only one light beam L1 by only one optical channel of the system 500—the right channel corresponding to the lens 520. As shown in FIG. 5A, the beamsplitting unit 504 is configured to transmit spectrally-different portions 530A, 530B, 530C of the received light-beam L1 to respectively-corresponding optical sensors 540A, 540B, 540C (shown to be separated from the respectively-corresponding output facets of the unit 400). An optical axis of each of the lenses 520, 524 is appropriately shifted in a plane that is transverse to the line along which the edges of the individual dichroic filters 410, 414, 510, 514 adjoin each other, to avoid the scatter of incoming light at the area of the seam S (illustrated in FIG. 4A). Generally, each of the optical axes of the lenses 520, 524 is transverse to the input facet 560 of the unit 504; in one specific implementation these axes are parallel to each other and perpendicular to the facet 560.

As shown, the incoming beam of light L1 partially transmitted through the dichroic filter 410, which redirects a first NIR portion 530A of the beam L1 towards the sensor 540A while passing the remaining light towards the dichroic filter 414. The filter 414 redirects a second NIR portion 530B of light incident thereon towards the sensor 540B, while partially transmitting light portion 530C in the visible part of optical spectrum towards the sensor 540C. In the specific implementation 500, the filter components 410, 414 are devised to reflect light in the NIR spectral bands centered, respectively at about 1600 nm and 900 nm. (In a related embodiment, the three spectral bands of interest may include a visible band, a band centered at about 800 nm, and another band centered at about 1200 nm.)

FIG. 5B provides a complementary illustration of the configuration of the dichroic filters 510, 514 of the unit 504. For simplicity of illustration, FIG. 5B depicts the acquisition of 3D optical information from only one light beam L2 by only one optical channel of the system 500—the left channel corresponding to the lens 524. The beam of light L2 arriving from the target tissue through the lens 524 is partially transmitted through the dichroic filter 510, which redirects one NIR portion 550B of the beam L2 towards the sensor 540BA while passing the remaining light towards the dichroic filter 514. The filter 514 redirects another NIR portion 550A of light incident thereon towards the sensor 540A, while partially transmitting light portion 550C in the visible part of optical spectrum towards the sensor 540C. In the specific implementation, the filter components 510, 514 are devised to reflect light in the NIR spectral bans centered, respectively at about 900 nm and 1600 nm. Phrased differently, in the specific embodiment the optical properties of filters 410 and 514 are substantially identical, and the optical properties of filters 510 and 414 are substantially identical. The configuration of the optical system 500 incorporating the two 3D optical channels (respectively defined by the two lenses 520, 524) advantageously differentiates the embodiment from the existing to-date light-collecting units of laparoscopic systems.

It is appreciated that the embodiment of FIGS. 5A, 5B provides an example of an optical system containing first, second, third, and fourth dichroic beamsplitters. An area of each of these dichroic beamsplitters is bound by a corresponding polygon, said dichroic beamsplitters disposed such that primary sides of the first and second polygons extend along a predetermined line and are immediately adjacent to one another; and two optical lenses, each having a corresponding optical axis that is transverse to the predetermined line and passes through bodies of at least two peripheral polygons at points each of which is spatially separated by a distance from corresponding primary sides of the at least two peripheral polygons; said lenses disposed on the same side with respect to a group of said dichroic beamsplitters.

Splitting the light-detection functionality into at least three spectral bands (as shown in reference to FIGS. 5A, 5B—visible, NIR, and IR bands) advantageously differentiates an embodiment from the related art as far as image sensor selection is concerned. In one embodiment, small form-factor, high-resolution sensors are used. The examples of commercially-available sensors configured to operate in different portions of the spectrum are provided at sionyx-.com/pdf/SiOnyx %2OXQE-0920%20datasheet %20brief %20non-confidential.pdf; oemoffhighway.com/product/ 10704729/-ga640c-15a-cubic-inch-swir-camera (InGaS GA640C-15A sensor), and ovt.com/ download_document.php?type=sensor&sensorid=113 (sensor for visible portion of the spectrum, Omnivision OV9724). The sensor 540C, configured to operate in the visible portion of the spectrum, can be optionally equipped with a Bayer filter mosaic. Generally, however, the sensors operating in the NIR and IR bands are devoid of the Bayer filter. In one embodiment, the Omnivision filter can be stripped of its Bayer filter and used for detection of IR (for example, 900 nm) light.

Figure 6A:
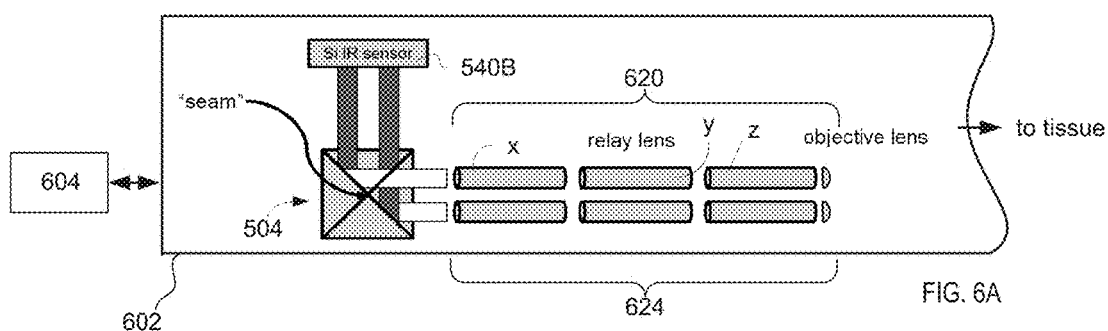
FIGS. 6A, 6B, and 6C are diagrams illustrating an optical assembly housed in a sheath and configured for use as an endoscopic probe.
Figure 6B:
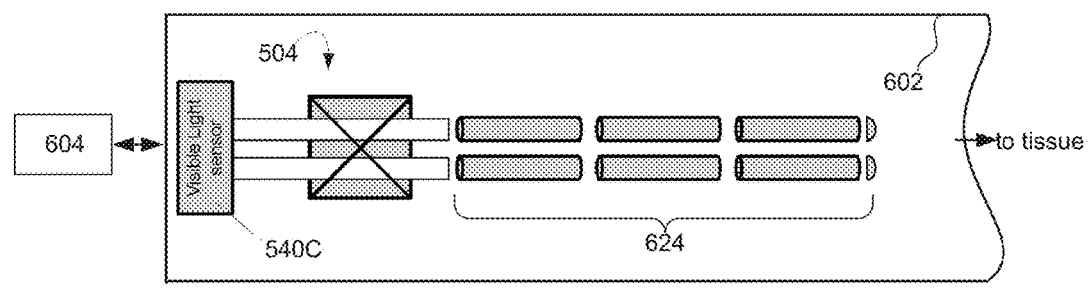
Figure 6C:
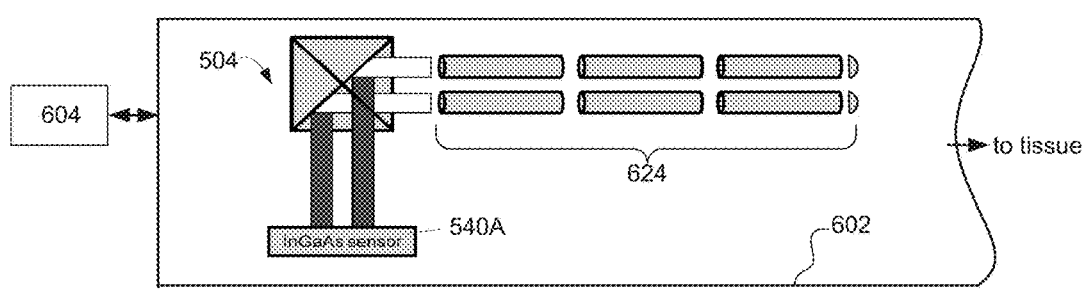

Schematic diagrams of FIGS. 6A, 6B, and 6C provide complementary illustrations of a portion 600 of an embodiment of a proximal sensing laparoscope device having an optionally flexible sheath or housing 602, characterized by internal volume in which the components of an optical-signal acquisition system (such as that described in reference to FIGS. 5A, 5B) are enclosed. Each of the optical lenses 620 and 624, having substantially parallel optical axes and aggregately defining two respectively-corresponding 3D optical channels, includes a corresponding objective lens and a lens-relay system (the latter shown in this example to include a sequence of three coaxial GRIN lenses x, y, and z). The portion 600 is configured in operable communication with an external data-processing system 604, which may include electronic circuitry such as a programmable processor equipped with a tangible, non-transitory storage medium on which program code governing the regime(s) of collection and processing of optical data with the optical-signal acquisition system can be stored.

The schematic diagram of FIG. 7A illustrates an embodiment 700 related to that of FIGS. 6A, 6B, and 6C, but in which the optical communication between the sensors 540A, 540B, and 540C and the beamsplitting unit 504 is established by transmission of light through optical components 710A, 710B, 710C. These components are dimensioned and/or configured to modify the curvatures of the wavefronts of spatial distributions of radiation interacting with such optical components. Generally, at least one of the sensors may be separated from the beamsplitting unit of the invention by such an optical component (which may include an optical lens and/or a reflector such as a mirror, flat or curved).

It is understood that, while embodiments of FIGS. 5A, 5B, 6A, 6B, 6C, and 7A were discussed in reference to a beamsplitting unit 504 structured according to the principles of the unit 400 of FIG. 4A, any beamsplitting unit configured according to the idea of the invention (such as units 426, 430, 448 of FIGS. 4C, 4D, 4E, to name just a few) can be used in a related embodiment.

A diameter of a typical laparoscope is about 10 mm, which provides an idea of a size of a stereoscopic embodiment of the invention that has to be achieved to be able to fit the beamsplitting unit, at least three sensors, optimechanical components, and the two lenses in the barrel of the sheath. A clear aperture of the embodiment 400 of the beamsplitting unit, for example, can be assumed to be about 5 mm.

Figure 7B:
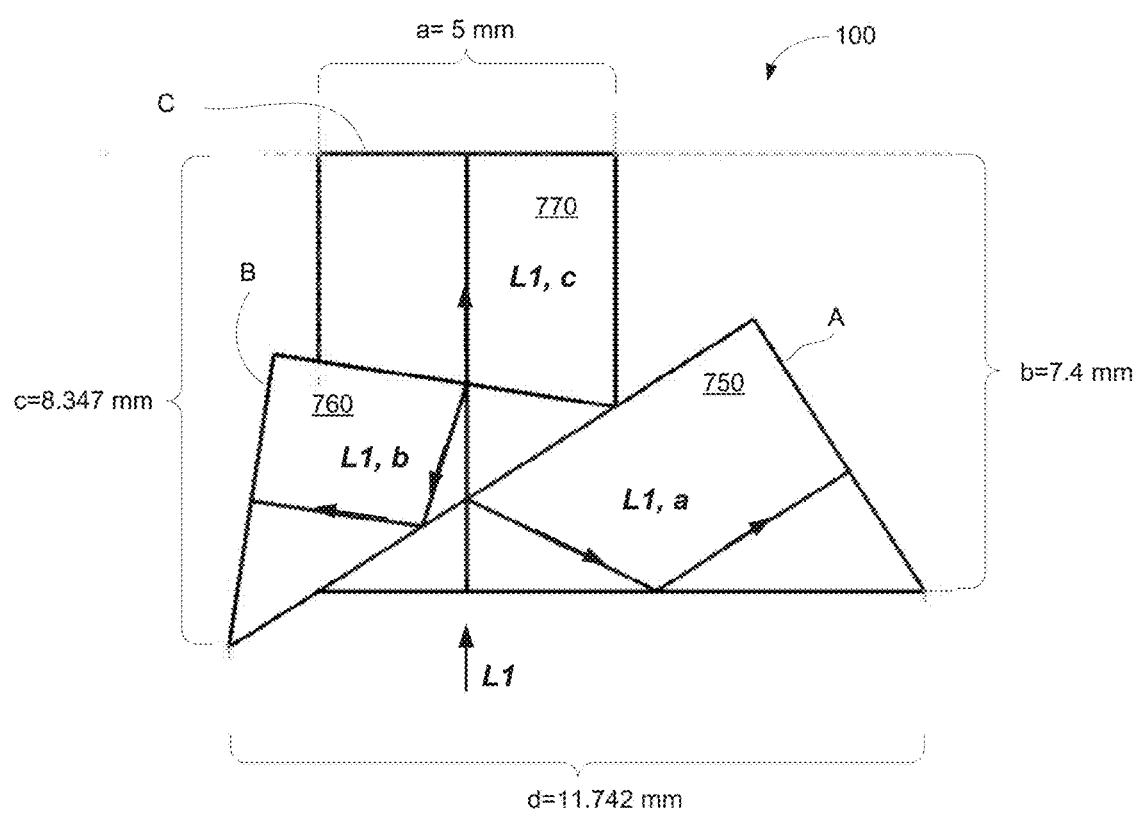
FIG. 7B illustrates dimensions of the embodiment of FIG. 1 required to ensure a clear throughput aperture a to be of a specified size.

Comparing the spatial "footprint" of an embodiment of the invention and that of a prior art contraption 100 (of FIG. 1), it is easy to appreciate the compactness of the embodiment of the invention that facilitates the miniaturization of the laparoscope utilizing the embodiment. For example, and referring to FIG. 7B, in order to emulate the 5 mm clear "throughput" aperture of the embodiment 400 (of FIG. 4A) in the embodiment 100 of the related art, the remaining dimensions of the embodiment 100 have to substantially exceed the 5 mm limit. As shown, the clear throughput aperture a is 5 mm, while the other dimensions b, c, and d results in an operational footprint of the Philips prism that, if incorporated into a laparoscope housing, would require such housing to have a substantially larger diameter than that of the housing 602. FIG. 7B additionally illustrates beam portions (L1,a; L1,b; L1,c) of the input beam of light L1 that are partially transmitted at each dielectric interface at which light from the beam L1 is reflected within the embodiment 100. Sensors (shown in FIG. 1) are omitted for simplicity of illustration.

Employing an embodiment of the invention for imaging an auto-fluorescing or exogenously-fluorescing biological tissue, for example, would facilitate the acquisition of false color-hyperspectral 3D images. For example, when two IR contrasting agents are delivered to the target tissue to operate as imaging markers (for example, a 800-nm contrasting agent such as ICG as a marker for cancer cells and a 700-nm contrasting agent such as Methylene Blue for nerve cells, an embodiment of the system can procure both of the images of the tumor and nerve cells at the same time (i.e., in an overlap of the two images) or as separate images, in different colors, to differentiate and localize the regions occupied by tumor from the regions occupied by nerve cells. An example of such pseudo-color images are shown in FIG. 8A, 8B, representing the same portion of the body to localize the tumor and nerve tissue.

Figure 11:
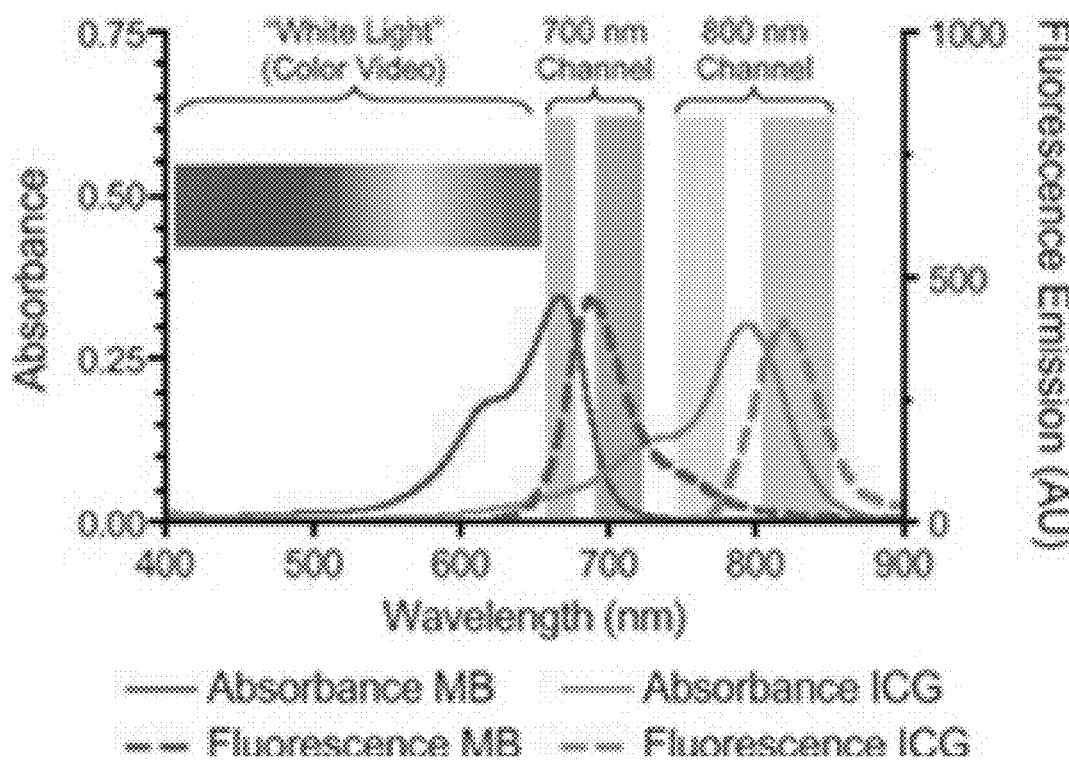
FIG. 11 includes a plot illustrating spectral distribution of absorbance and fluorescence of some identified dyes.

Spectral curves illustrating absorbance characteristics of the above-identified examples of contrast agents are presented in FIG. 11. Specifically, FIG. 11 illustrates absorption and fluorescence-related spectra for ICG and MB dyes, to demonstrate that two different dyes could be used with two different sensors (one receiving radiation at about 700 nm and the other at about 825 nm) to generate the hyperspectral images of FIG. 8. FIG. 12 illustrates some of the different IR dyes. Additional information on IR-contrasting agents— such as products by Licor Inc., containing an IRDyeX, where X represents a wavelength of light in nm—are summarized in Table 1. This information is available at licor.com/bio/products/reagents/irdye. Additionally, while the-longer-wavelength fluorescent markers remain underdeveloped, new progress has been made in single-walled carbon nanotubes (see, for example, ncbi.nlm.nih.gov/pubmed/15884905). Specifically, fluorescence microscopy in the near-infrared between 950 and 1600 nm has been developed as a novel method to image and study single-walled carbon nanotubes (SWNTs) used as fluorescent markers in a variety of environments.

In another related embodiment, rather than adding additional beam-splitting surfaces in planes orthogonal to the original two beam-splitting planes of the embodiment 500, more beam-splitting surfaces are defined in a different angular relationship to the original two surfaces, which is defined while maintaining a single seam line S extending along the co-linearly placed apexes of the constituent prisms.

Figure 9A:
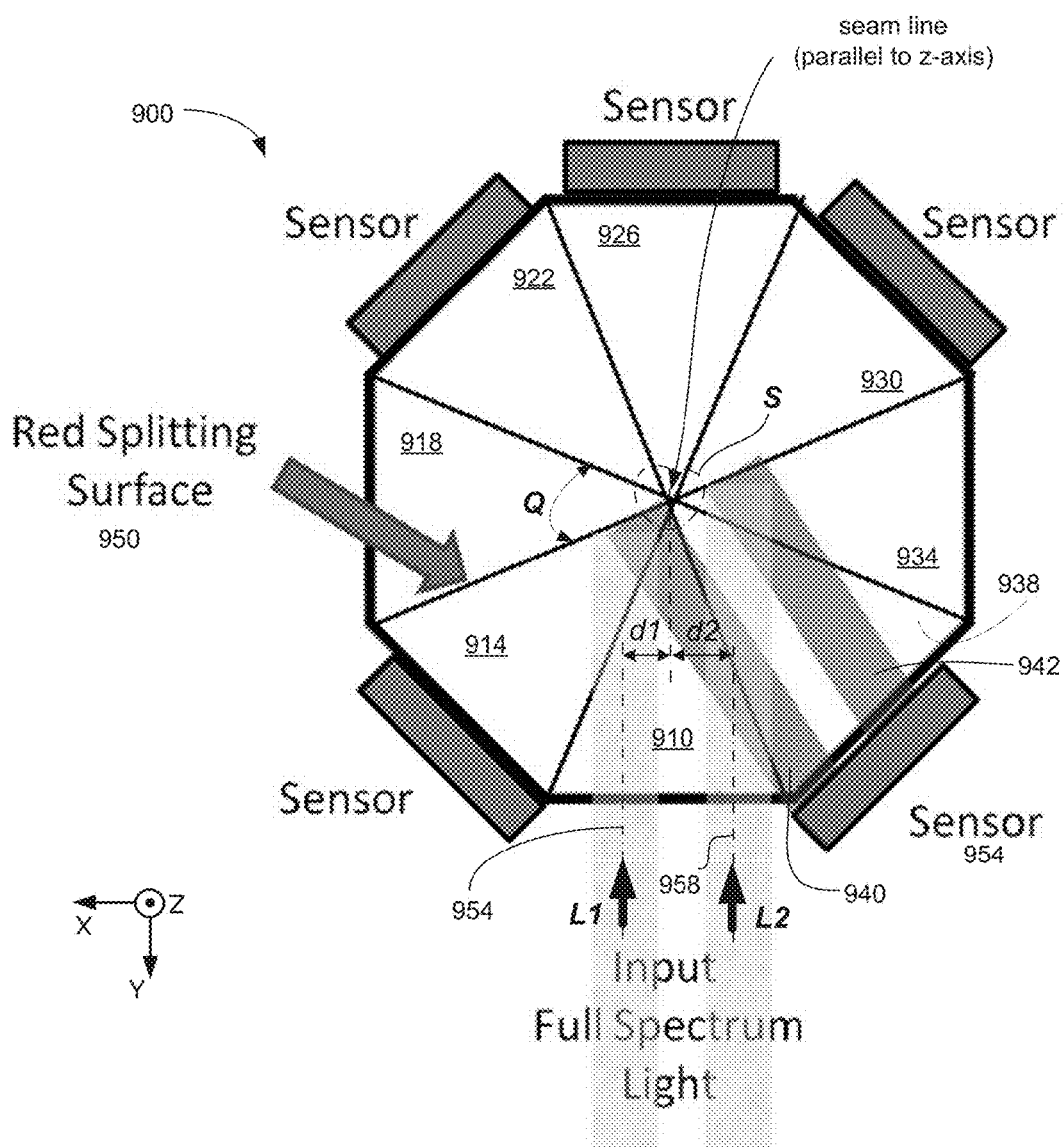
FIGS. 9A and 9B are cross-sectional diagrams of a related embodiment of an optical assembly of the invention.

A specific example of such embodiment 900, containing eight constituent prisms 910, 914, 918, 922, 926, 930, 934, 938 (none of which is a right-angle prism but, instead, has an apex angle of about 45 degrees) is shown in FIG. 9A. The image-quality reducing seam area or line S extends, as shown, into the plane of the figure along the z-axis. While each of the dichroic filters, appropriately placed in coordination with each of the prism-facets forming the roofs of the constituent prisms, operates by spatially and spectrally splitting a beam of light incident thereon, FIG. 9A illustrates the formation of only one partial beam from each of the full-spectrum input beams of light L1, L2 delivered through the two optical lenses (not shown). The shown partial beams are beams 940, 942, formed at the splitting surface 950 along which the prisms (914, 918) and the prisms (930, 934) adjoin each other. Images of the target formed in light provided by these partial beams are registered by a respective detector 954. As required by the idea of the invention, the optical axes 956, 958 of the lenses are shown shifted, in a plane transverse to the seam line, by distances d1 and d2 from the seam line to avoid undesirable light scatter at the seam.

Certain limitations may be required, in some embodiments, on the angles of the beam splitting surfaces and the size of the constituent (individual) prism components of a given optical assembly. In particular, the related embodiments of the beamsplitting unit can be formed from constituent prisms with apex angles of 180/(n−1) degrees, where n is an odd integer, the apexes of all of which are disposed immediately adjacent to one another along the same line to form a seam of the beamsplitting unit. When all individual component prisms have the same shape, the number of individual sensors required for operation of the optical assembly is n, among which the number of sensors "looking" at a beam-splitting surface of the beamsplitting unit is (n−1), and a number of beam-splitting surfaces in the beamsplitting unit is (n−1). In the example of the embodiment 900 of FIG. 9A, n=5 and an apex angle Q=45 degrees. In the examples of embodiments 400, 426 n=3 and the apex angle A is 45 degrees.

Referring further to the diagram of FIG. 9A, the embodiment 900 is configured such that the first dichroic beamsplitter of the embodiment 900 directs a portion, of input light, having a first spectral characteristic to the first optical detector. At the same time, the second dichroic beamsplitter directs a portion, of input light, having a second spectral characteristic to the second optical detector. The third dichroic beamsplitter directs a portion of input light having a third spectral characteristic to the third optical detector. The fourth, fifth, sixth, seventh, and eighth dichroic beamsplitters direct respectively corresponding portions of input light having fourth, fifth, sixth, seventh, and eighth spectral characteristics the fourth, fifth, sixth, seventh, and eighths optical detectors.

Figure 9B:
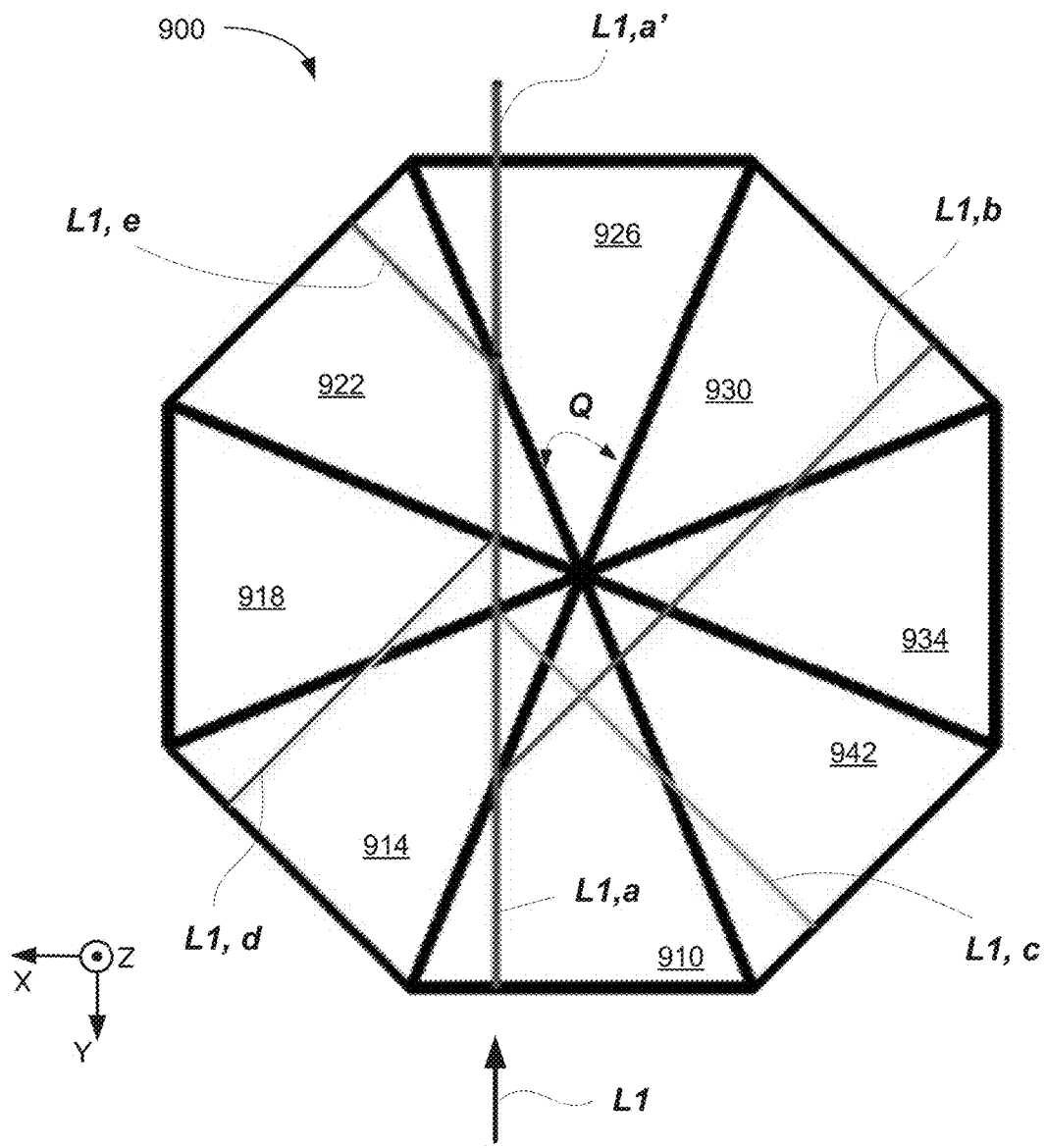

FIG. 9B provides a supplementary schematic diagram showing beam portions (L1,a; L1,b; L1,c; L1,d; L1,e) of the input beam of light L1 that are partially transmitted at each dielectric interface at which light from the beam L1 is reflected within the embodiment 900.

Figure 10:
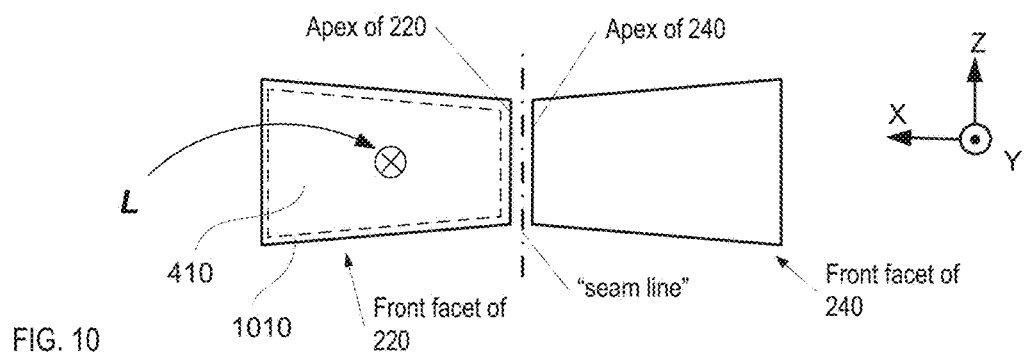
FIG. 10 is a diagram illustrating a concept of seam in an embodiment of the invention.

Referring again to FIG. 4A and in further reference to FIG. 10, FIG. 10 provides additional illustration to the concept of seam or seam line or seam area that causes image defects in systems of related art. The beamsplitting unit 400 of FIG. 4A is schematically shown as viewed down the axis 418 along the direction of propagation of light beam L (in other words, in the −y direction). As illustrated, front facets of constituent prisms are those that face light incoming from the target. The seam line is defined by a line along which the apexes of immediately adjacent constituent prisms are aligned (and optionally separated by a small space, as shown in FIG. 10 or, alternatively, brought in contact with one another). As shown, the dichroic filter element 410 has an area that is bound by the polygon 1010.

FIG. 11 includes a plot illustrating spectral distribution of absorbance and fluorescence of some identified dyes; FIG. 12 includes Table 1 summarizing several itemized spectral characteristics of IR dyes.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

For example, a reference to an identified vector or line or plane being substantially parallel to a referenced line or plane is to be construed as such a vector or line or plane that is the same as or very close to that of the referenced line or plane (with angular deviations from the referenced line or plane that are considered to be practically typical in related art, for example between zero and fifteen degrees, preferably between zero and ten degrees, more preferably between zero and 5 degrees, even more preferably between zero and 2 degrees, and most preferably between zero and 1 degree). For example, a reference to an identified vector or line or plane being substantially perpendicular to a referenced line or plane is to be construed as such a vector or line or plane the normal to the surface of which lies at or very close to the referenced line or plane (with angular deviations from the referenced line or plane that are considered to be practically typical in related art, for example between zero and fifteen degrees, preferably between zero and ten degrees, more preferably between zero and 5 degrees, even more preferably between zero and 2 degrees, and most preferably between zero and 1 degree). As another example, the use of the term "substantially flat" in reference to the specified surface implies that such surface may possess a degree of non-flatness and/or roughness that is sized and expressed as commonly understood by a skilled artisan in the specific situation at hand.

Other specific examples of the meaning of the terms "substantially", "about", and/or "approximately" as applied to different practical situations may have been provided elsewhere in this disclosure.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

Within this specification, embodiments have been described in a way that enables a clear and concise specification to be written, but it is intended and will be appreciated that embodiments may be variously combined or separated without parting from the scope of the invention. In particular, it will be appreciated that all features described herein at applicable to all aspects of the invention.

In addition, when the present disclosure describes features of the invention with reference to corresponding drawings (in which like numbers represent the same or similar elements, wherever possible), the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, at least for purposes of simplifying the given drawing and discussion, and directing the discussion to particular elements that are featured in this drawing. A skilled artisan will recognize that the invention may possibly be practiced without one or more of the specific features, elements, components, structures, details, or characteristics, or with the use of other methods, components, materials, and so forth.

While the invention is described through the above-described exemplary embodiments, it will be understood by those of ordinary skill in the art that modifications to, and variations of, the illustrated embodiments may be made without departing from the inventive concepts disclosed herein.

Disclosed aspects, or portions of these aspects, may be combined in ways not listed above. Accordingly, the invention should not be viewed as being limited to the disclosed embodiment(s).

What is claimed is:

1. An optical assembly comprising:
at least two pairs of dichroic beamsplitting elements grouped together such that first sides of the first and second dichroic beamsplitting elements in each of the at least two pairs are parallel and immediately adjacent to one another and to a predetermined line,
two optical lenses disposed such that light transmitted through said lenses towards said at least two pairs of dichroic beamsplitting elements passes through each of elements from said at least two pairs of the dichroic beamsplitting elements, and
at least two image sensors, each of the at least two image sensors positioned to receive said light that has passed, in operation of the optical assembly, through both a) a pair of the at least two pairs of the dichroic beamsplitting elements and b) one of the two optical lenses.

2. An optical assembly according to claim 1, wherein a first dichroic beamsplitting element in a first pair of the at least two pairs of dichroic beamsplitting elements and a first dichroic beamsplitting element in a second pair of the at least two pairs of dichroic beamsplitting elements have equal optical properties.

3. An optical assembly according to claim 1, wherein said light includes infrared light and wherein one of the at least two image sensors is configured to detect said infrared light.

4. An optical assembly according to claim 1, wherein a dichroic beamsplitting element from said at least two pairs of dichroic beamsplitting elements is defined on a facet of an optical prism.

5. An optical assembly comprising:
first, second, third, and fourth dichroic beamsplitter elements, an area of each of the dichroic beamsplitter element bound by corresponding first, second, third, and fourth polygons,
wherein said first, second, third, and fourth dichroic beamsplitter elements are disposed such that first sides of each of said first, second, third, and fourth polygons extend along a predetermined line and are immediately adjacent to one another; and
two optical lenses, each having a corresponding optical axis that is transverse to the predetermined line and passes through bodies of at least two polygons of said first second, third, and fourth polygons at points each of which is spatially separated by a distance from corresponding primary sides of the at least two polygons;
said lenses disposed on the same side with respect to a group of said first, second, third, and fourth dichroic beamsplitter elements;
and at least two image sensors positioned to receive light that has passed through both a) each of the first, second, third, and fourth dichroic beamsplitter elements and b) at least one of the optical lenses.

6. An optical assembly according to claim 5, wherein the distance is equal to or larger than a radius of an optical lens.

7. An optical assembly according to claim 5, wherein optical axes of the two optical lenses are parallel to one another.

8. An optical assembly according to claim 5, wherein a dichroic beamsplitter element from said first, second, third, and fourth dichroic beamsplitter elements is defined on a facet of an optical prism, and wherein an apex of said optical prism defines the first side of said dichroic beamsplitter element from said first, second, third, and fourth dichroic beamsplitter elements.

9. An optical assembly according to claim 5, wherein the first, second, third, and fourth dichroic beamsplitter elements are formed on facets of first, second, and third prisms, wherein an apex of the first prism defines the predetermined line, wherein the apexes of the second and third prisms define first sides of the corresponding first, second, third, and fourth polygons.

10. An optical assembly according to claim 5,
wherein the first and second dichroic beamsplitter elements are formed on facets of respectively-corresponding first and second prisms,
wherein each of said at least two image sensors is disposed at a facet of a base of a corresponding prism, from the first and second prisms, to intersect one of partial beams of light that are produced, in operation, from light delivered by a lens from the two optical lenses towards the group of said first, second, third, and fourth dichroic beamsplitter elements.

11. An optical assembly according to claim 5, further comprising a housing configured to enclose said first, second, third, and fourth dichroic elements and the two optical lenses, optical axes of the two optical lenses being parallel to one another, the optical system configured as a laparoscope with the two optical lenses disposed at a distal end thereof.

12. An optical assembly according to claim 5, wherein those of first, second, third, and fourth dichroic beamsplitter elements that are intersected by an axis of an optical lens from the two optical lenses, are configured to spatially split a beam of light that has passed through said optical lens into at least three partial beams having different spectra.

13. An optical assembly according to claim 12, wherein each of said at least two image sensors is disposed in optical communication with at least one of the two lenses to intersect a respectively corresponding beam of the at least three partial beams, one of the two image sensors being devoid of a Bayer filter.

14. An optical assembly according to claim 12, wherein a first of the different spectra includes visible wavelengths and a second of the different spectra includes wavelengths exceeding 1200 nm.

15. An optical assembly according to claim 5, wherein a surface of at least one of said first, second, third, and fourth dichroic beamsplitting elements is curved.

16. An optical assembly according to claim 5, wherein said light includes infrared light and wherein one of the at least two image sensors is configured to detect said infrared light.

17. An optical assembly according to claim 5,
further comprising a third image sensor,
wherein the third dichroic beamsplitter element is formed on a facet of a third prism, an apex of the first prism defining the predetermined line, the apexes of the second and third prisms defining first sides of the corresponding first, second, and third polygons,
wherein each of said at least two image sensors and said third image sensor is disposed at a facet of a base of a corresponding prism from the first, second, and third prisms.

18. A method for operating an optical assembly, the method comprising:
- transmitting light from outside of the optical assembly through two lenses of said assembly towards at least four dichroic beamsplitter elements of said assembly, wherein said assembly is disposed within a cylindrical housing,
  - wherein an operating surface of each of said at least four dichroic beamsplitter elements is bound by a respective polygon,
  - wherein first sides of all polygons are parallel to a predetermined line and immediately adjacent to one another, and
  - wherein an optical axis of each of the two lenses is transverse to the predetermined line, is spaced therefrom by a distance, and intersects at least bodies of at least two of polygons that bound operating surfaces of the at least four dichroic beamsplitter elements; and
- reflecting said light recevied from at least two of said at least four dichroic beamsplitter elements to form at least first and second reflected portions of light and a transmitted portion of light, and
- receiving each of said reflected and transmitted portions of light by a corresponding optical detector from at least three optical detectors of the optical assembly.

19. A method according to claim 18, wherein said reflecting includes reflecting said light from said at least four dichroic beamsplitter elements to form at least first, second, third, and fourth reflected portions of light and two transmitted portions of light, and wherein said receiving includes receiving, by each of the at least three optical detectors, at least two portions of light from said first, second, third, and fourth reflected portions and the two transmitted portions.

20. A method for operating an optical assembly, the method comprising:
- a) receiving a first light at a first optical lens having a first optical axis;
- b) receiving a second light at a second optical lens having a second optical axis; and
- c) transmitting the first light and the second light, received from the first and second optical lenses, through a plurality of the dichroic beamsplitters including first, second, third, and fourth dichroic beamsplitters, wherein
  an area of each of the first, second, third, and fourth dichroic beamsplitters is bound, respectively, by first, second, third, and fourth polygons,
wherein
  primary sides of the first and second polygons that define, respectively, perimeters of the first and second beamsplitters extend along a predetermined axis and are immediately adjacent to one another, and
  primary sides of the third and fourth polygons that define, respectively, perimeters of the third and fourth beamsplitters extend along said predetermined axis and are immediately adjacent to one another, wherein
  the first optical axis passes through the first dichroic beamsplitter and the third dichroic beamsplitter, and
  the first optical axis passes through the first dichroic beamsplitter at a first point that is spatially separated by a first distance from a primary side of the first dichroic beamsplitter,
wherein
  the second optical axis passes through the second dichroic beamsplitter and the fourth dichroic beamsplitter, and
  the second optical axis passes through the second dichroic beamsplitter at a second point that is spatially separated by a second distance from a primary side of the second dichroic beamsplitter.

21. The method according to claim 20, further comprising positioning the first optical axis and the second optical axis transversely to the predetermined line.

22. The method according to claim 20, further comprising disposing the first optical lens and the second optical lens on the same side with respect to the first and second dichroic beamsplitters.

23. An optical system comprising
- a first dichroic beamsplitter, an area of which is bound by a first polygon having a primary first polygon side;
- a second dichroic beamsplitter, an area of which is bound by a second polygon having a primary second polygon side that is nearer to the primary first polygon side than other sides of the first polygon;
- a third dichroic beamsplitter, an area of which is bound by a third polygon;
- a fourth dichroic beamsplitter, an area of which is bound by a fourth polygon;
- a first optical lens having a first optical axis; and
- a second optical lens having a second optical axis, wherein
  the first dichroic beamsplitter and the second dichroic beamsplitter are disposed such that the primary first polygon side and the primary second polygon side are parallel to a predetermined line and are immediately adjacent to one another,
  the first optical axis and the second optical axis are transverse to the predetermined line,
  the first optical axis passes through the first polygon at a first distance from the primary first polygon side;
  the second optical axis passes through the second polygon at a second distance from the primary second polygon side;
  the first optical axis passes through the third polygon;
  the second optical axis passes through the fourth polygon;
  the first optical lens and the second optical lens are disposed on the same side with respect to the first dichroic beamsplitter and the second dichroic beamsplitter.

* * * * *